UNITED STATES PATENT OFFICE.

KARL ELBEL AND EDWARD WRAY, OF BIEBRICH, GERMANY, ASSIGNORS TO THE FIRM OF RALLE & COMPANY, AKTIENGESELLSCHAFT, OF BIEBRICH, GERMANY.

VAT-DYEING COLORING-MATTER.

999,439.     Specification of Letters Patent.     Patented Aug. 1, 1911.

No Drawing.     Application filed March 14, 1910. Serial No. 549,330.

*To all whom it may concern:*

Be it known that we, KARL ELBEL, doctor of philosophy and chemist, subject of the King of Prussia, and EDWARD WRAY, chemist, and subject of the King of England, both residing at Biebrich-on-the-Rhine, Germany, have invented certain new and useful Improvements in the Manufacture of Vat-Dyeing Coloring-Matters, of which the following is a specification.

It is known that, by the condensation of alpha-reactive isatin derivatives with oxy derivatives of cyclic hydrocarbons, as for instance naphthol or anthrol or their derivatives, indigoid coloring matters are obtained. In this condensation the phenolic bodies react as if they contained the group

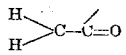

according to the following equation:

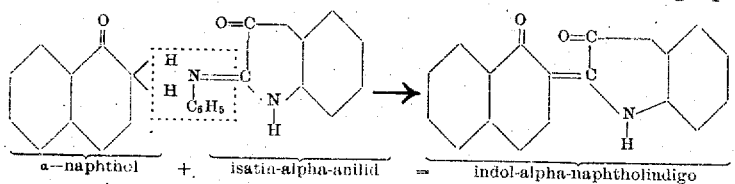

Compounds to be used for the condensation and containing the hydroxyl group with a free ortho position, which contain substituents excepting such as are liable to hinder the formation of fast vat coloring matters (for instance free hydroxyl-, or sulfo-, groups), yield indigoid dyestuffs possessing some degree of fastness against the action of alkalis. But notwithstanding this, only a few representatives of the above named class of coloring matters satisfy the high requirements to be met with in vat-dyeing coloring matters as regards general fastness.

We have now found that vat dyeing coloring matters of considerably greater fastness can be obtained if the indigoid coloring matters be treated in a suitable manner with bromin. As initial materials for the bromination, the indigoid coloring matters prepared by condensing alpha-isatin derivatives with substituted phenols or naphthols may be used, and also those which can be obtained from an alpha-isatin derivative capable of reaction by condensation with a compound of the aromatic series which, besides the hydroxyl group, contains no further substituent. In the latter case, it is necessary, in order to obtain satisfactorily fast products, to introduce into the molecule of the coloring matter larger amounts of bromin than when the initial products are indigoid coloring matters in which a number of hydrogen atoms are substituted by other atoms or atomic groups. Highly brominated vat dyes can of course also be obtained by condensing brominated alpha-isatin derivatives with phenols or naphthols or substitution products of the same for instance those containing halogen atoms.

The following are examples of how this invention may be carried out, but the invention is not limited to these examples. The parts are by weight.

Example I: Into 900 parts sulfuric acid, from 80 to 100 parts of bromin are introduced. To this mixture are added, at ordinary temperature, and in successive portions at a time, 30 parts of the coloring matter obtained from 1.4 - dioxy - naphthalene - mono-methyl ether and alpha-isatin anilid (see German specification No. 207097 of the formula:

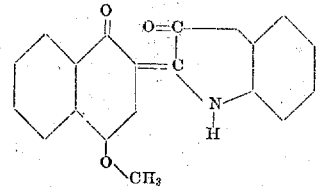

The mass is then stirred for three hours without the temperature being increased, and then the reaction mixture is allowed to stand for about six hours longer. It is then poured into ice and a little sodium bisulfit, and the precipitated coloring matter is filtered off and well washed. In this manner a product is obtained which, in the vat, produces very pure blue shades on cotton.

Example II: In 1300 parts of sulfuric acid are suspended from 65 to 90 parts of bromin and then 43 parts of indol-alpha-naphtholindigo obtained from alpha-naphthol and dibromo-alpha-isatin chlorid (see German specification No. 207097 and having the formula:

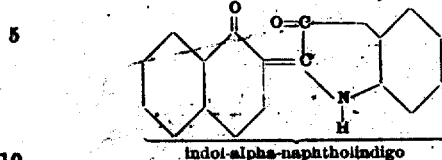

indol-alpha-naphtholindigo are introduced into the suspension. The reaction mass is then stirred for a few hours at ordinary temperature, and is then heated for three hours, or thereabout, at about 50° centigrade. Then the mass is diluted with ice water and filtered and the separated coloring matter is washed out. This dyestuff produces, on cotton, in the vat, blue tints of remarkable fastness.

Instead of the coloring matters mentioned in the foregoing examples, other indigoid coloring matters may be employed, and, instead of bromin itself, substances may be used which are capable of yielding bromin.

The bromination can be carried out with chloro-sulfonic acid as well as with sulfuric acid and the bromination can be effected with dry bromin at ordinary temperature, or at a moderately high temperature, or at a still higher temperature by the use of neutral dilution agents.

It appears probable that per-bromids are first formed and that these pass into the substitution products.

As completely satisfactory fastness of the new products to washing in part depends on the degree of bromination, it is necessary to introduce into the molecule of coloring matter quantities of bromin in accordance with the nature of the initial product selected.

What we claim is:

1. The production of fast vat coloring matters consisting in treating with bromin the products obtainable by condensation of reactive alpha-isatin derivatives with oxy derivatives of cyclic hydrocarbons.

2. The herein described process of producing a fast vat coloring matter consisting in treating with bromin the product obtained by condensing dibromo-alpha-isatin-chlorid with alpha-naphthol.

3. As a new product the vat coloring matter consisting of the brominated indol-alpha-naphtholindigo being blue powder soluble in sulfuric acid with greenish-blue color, in hot nitrobenzene and in hot anilin with pure blue color, insoluble in water and alcohol yielding on alkaline reduction a yellow vat in which the textile fibers are dyed in bright blue shades.

In testimony whereof we have signed our names to this specification in the presence of two subscribing witnesses.

KARL ELBEL.
EDWARD WRAY.

Witnesses:
HERMAN PLISOHDE,
MAX ZIESCHE.

---

It is hereby certified that the name of the assignee in Letters Patent No. 999,439, granted August 1, 1911, upon the application of Karl Elbel and Edward Wray, of Biebrich, Germany, for an improvement in "Vat-Dyeing Coloring-Matters," was erroneously written and printed as "the firm of Ralle & Company, Aktiengesellschaft," whereas said name should have been written and printed as *the firm of Kalle & Company, Aktiengesellschaft*; and that the said Letters Patent should be read with this correction therein that the same may conform to the record of the case in the Patent Office.

Signed and sealed this 7th day of November, A. D., 1911.

[SEAL.]

E. B. MOORE,
*Commissioner of Patents.* thol and dibromo-alpha-isatin chlorid (see German specification No. 207097 and having the formula:

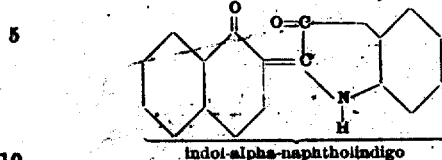

indol-alpha-naphtholindigo are introduced into the suspension. The reaction mass is then stirred for a few hours at ordinary temperature, and is then heated for three hours, or thereabout, at about 50° centigrade. Then the mass is diluted with ice water and filtered and the separated coloring matter is washed out. This dyestuff produces, on cotton, in the vat, blue tints of remarkable fastness.

Instead of the coloring matters mentioned in the foregoing examples, other indigoid coloring matters may be employed, and, instead of bromin itself, substances may be used which are capable of yielding bromin.

The bromination can be carried out with chloro-sulfonic acid as well as with sulfuric acid and the bromination can be effected with dry bromin at ordinary temperature, or at a moderately high temperature, or at a still higher temperature by the use of neutral dilution agents.

It appears probable that per-bromids are first formed and that these pass into the substitution products.

As completely satisfactory fastness of the new products to washing in part depends on the degree of bromination, it is necessary to introduce into the molecule of coloring matter quantities of bromin in accordance with the nature of the initial product selected.

What we claim is:

1. The production of fast vat coloring matters consisting in treating with bromin the products obtainable by condensation of reactive alpha-isatin derivatives with oxy derivatives of cyclic hydrocarbons.

2. The herein described process of producing a fast vat coloring matter consisting in treating with bromin the product obtained by condensing dibromo-alpha-isatin-chlorid with alpha-naphthol.

3. As a new product the vat coloring matter consisting of the brominated indol-alpha-naphtholindigo being blue powder soluble in sulfuric acid with greenish-blue color, in hot nitrobenzene and in hot anilin with pure blue color, insoluble in water and alcohol yielding on alkaline reduction a yellow vat in which the textile fibers are dyed in bright blue shades.

In testimony whereof we have signed our names to this specification in the presence of two subscribing witnesses.

KARL ELBEL.
EDWARD WRAY.

Witnesses:
HERMAN PLISOHDE,
MAX ZIESCHE.

---

Correction in Letters Patent No. 999,439.

It is hereby certified that the name of the assignee in Letters Patent No. 999,439, granted August 1, 1911, upon the application of Karl Elbel and Edward Wray, of Biebrich, Germany, for an improvement in "Vat-Dyeing Coloring-Matters," was erroneously written and printed as "the firm of Ralle & Company, Aktiengesellschaft," whereas said name should have been written and printed as *the firm of Kalle & Company, Aktiengesellschaft*; and that the said Letters Patent should be read with this correction therein that the same may conform to the record of the case in the Patent Office.

Signed and sealed this 7th day of November, A. D., 1911.

[SEAL.]

E. B. MOORE,
*Commissioner of Patents.*

It is hereby certified that the name of the assignee in Letters Patent No. 999,439, granted August 1, 1911, upon the application of Karl Elbel and Edward Wray, of Biebrich, Germany, for an improvement in "Vat-Dyeing Coloring-Matters," was erroneously written and printed as "the firm of Ralle & Company, Aktiengesellschaft," whereas said name should have been written and printed as *the firm of Kalle & Company, Aktiengesellschaft;* and that the said Letters Patent should be read with this correction therein that the same may conform to the record of the case in the Patent Office.

Signed and sealed this 7th day of November, A. D., 1911.

[SEAL.]

E. B. MOORE,
*Commissioner of Patents.*